(12) United States Patent
Ganesh et al.

(10) Patent No.: US 11,429,106 B2
(45) Date of Patent: Aug. 30, 2022

(54) METHODS AND SYSTEMS FOR SHIFTING OBJECTS

(71) Applicant: United Parcel Service of America, Inc., Atlanta, GA (US)

(72) Inventors: Bala Ganesh, Atlanta, GA (US); Thomas Ramsager, Atlanta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 294 days.

(21) Appl. No.: 16/573,650

(22) Filed: Sep. 17, 2019

(65) Prior Publication Data
US 2021/0080960 A1 Mar. 18, 2021

(51) Int. Cl.
*G05D 1/02* (2020.01)
*B64C 39/02* (2006.01)
*G05D 1/10* (2006.01)

(52) U.S. Cl.
CPC ......... *G05D 1/0214* (2013.01); *B64C 39/024* (2013.01); *G05D 1/101* (2013.01)

(58) Field of Classification Search
CPC .... G05D 1/0214; G05D 1/101; G05D 1/0094; B64C 39/024
See application file for complete search history.

(56) References Cited

U.S. PATENT DOCUMENTS

| | | | |
|---|---|---|---|
| 3,347,563 A | 10/1967 | Harbers | |
| 3,721,358 A | 3/1973 | Brock | |
| 4,077,534 A | 3/1978 | Baaso | |
| 4,768,802 A | 9/1988 | Winkler | |
| 5,098,115 A | 3/1992 | Haire et al. | |
| 5,411,359 A | 5/1995 | Kossila | |
| 7,149,611 B2 | 12/2006 | Beck et al. | |
| 7,874,385 B2 | 1/2011 | Gavarini et al. | |
| 7,878,750 B2 | 2/2011 | Zhou et al. | |
| 9,056,676 B1* | 6/2015 | Wang | G01C 21/3697 |
| 9,315,212 B1* | 4/2016 | Kyrtsos | B62D 15/0285 |
| 9,371,133 B2 | 6/2016 | Mays | |
| 10,322,874 B1 | 6/2019 | Curley | |

(Continued)

FOREIGN PATENT DOCUMENTS

| | | | |
|---|---|---|---|
| CA | 2932199 A1 | 12/2017 | |
| CN | 110944900 A * | 3/2020 | ........... G05D 1/0094 |

(Continued)

OTHER PUBLICATIONS

Extended European Search Report received for European Patent Application No. 20192839.7, dated Dec. 18, 2020, 9 pages.

(Continued)

*Primary Examiner* — Anne Marie Antonucci
*Assistant Examiner* — Connor L Knight
(74) *Attorney, Agent, or Firm* — Shook, Hardy & Bacon L.L.P.

(57) ABSTRACT

Systems, and methods of shifting objects using a vehicle and at least one drone are provided. The vehicle and drone are configured to communicate using communication components to coordinate movement of the at least one drone relative to the wheeled object. The system for shifting objects may include sensors for detecting characteristics of the environment. The system may include shifting the object to a second location based on the characteristics detected.

16 Claims, 9 Drawing Sheets

(56) References Cited

U.S. PATENT DOCUMENTS

| | | |
|---|---|---|
| 2002/0146310 A1 | 10/2002 | Chabanas et al. |
| 2003/0077157 A1 | 4/2003 | Smith et al. |
| 2003/0085562 A1 | 5/2003 | Sparling |
| 2006/0056086 A1* | 3/2006 | Hannah ................ B60Q 1/2665 359/843 |
| 2007/0095777 A1 | 5/2007 | Wierzba et al. |
| 2007/0166139 A1 | 7/2007 | Reed |
| 2007/0182528 A1* | 8/2007 | Breed ................... B60W 30/16 348/148 |
| 2009/0155035 A1 | 6/2009 | Lundin |
| 2009/0250901 A1 | 10/2009 | Lundin |
| 2010/0135757 A1 | 6/2010 | Welch et al. |
| 2011/0074132 A1 | 3/2011 | Banwart |
| 2011/0107938 A1 | 5/2011 | Weidemann et al. |
| 2011/0175323 A1 | 7/2011 | Kimener |
| 2011/0268543 A1 | 11/2011 | Welch et al. |
| 2011/0318148 A1 | 12/2011 | Obermeyer |
| 2013/0108402 A1 | 5/2013 | Herman et al. |
| 2013/0149087 A1 | 6/2013 | Jones |
| 2014/0003895 A1 | 1/2014 | MØller |
| 2015/0132091 A1 | 5/2015 | Obermeyer |
| 2015/0217609 A1 | 8/2015 | Ellis et al. |
| 2016/0068093 A1 | 3/2016 | Kibler |
| 2016/0129999 A1* | 5/2016 | Mays ................... G05D 1/0038 701/2 |
| 2016/0200235 A1 | 7/2016 | Stigler et al. |
| 2016/0257237 A1 | 9/2016 | Dagenais et al. |
| 2017/0174422 A1 | 6/2017 | Schomaker et al. |
| 2017/0361844 A1 | 12/2017 | Kahn et al. |
| 2019/0302764 A1* | 10/2019 | Smith ..................... B60R 1/003 |
| 2020/0047656 A1 | 2/2020 | Woodrough, Jr. |
| 2020/0148469 A1 | 5/2020 | Curley |
| 2020/0341467 A1* | 10/2020 | Glendenning ......... G08G 1/202 |

FOREIGN PATENT DOCUMENTS

| | | | |
|---|---|---|---|
| DE | 102017214185 A1 | | 2/2019 |
| EP | 2181915 A1 | | 5/2010 |
| GB | 2533140 A | | 6/2016 |
| KR | 20200010994 A | * | 1/2020 |
| WO | 2007/141795 A1 | | 12/2007 |
| WO | 2009/053524 A1 | | 4/2009 |
| WO | 2019/034365 A1 | | 2/2019 |
| WO | 2019/165147 A1 | | 8/2019 |
| WO | WO-2021021427 A1 | * | 2/2021 ............ B60W 30/06 |

OTHER PUBLICATIONS

Extended European Search Report received for European Patent Application No. 19190503.3, dated Jan. 3, 2020, 6 pages.
Morris et al., "Self-Driving Aircraft Towing Vehicles: A Preliminary Report", Artificial Intelligence for Transportation: Advice, Interactivity and Actor Modeling: Papers from the 2015 AAAI Workshop, Jan. 2015, pp. 41-48.
Tsai et al., "Autonomous Vision-Based Tethered-Assisted Rover Docking", 2013 IEEE/RSJ International Conference on Intelligent Robots and Systems (IROS), Nov. 3-7, 2013, pp. 2834-2841.
Non-Final Office Action received for U.S. Appl. No. 16/102,060, dated Jul. 23, 2020, 17 pages.
Extended European Search Report received for European Patent Application No. 21192315.6, dated Nov. 29, 2021, 7 pages.
Partial European Search Report received for European Patent Application No. 22166386.7, dated Jun. 24, 2022, 11 pages.

* cited by examiner

METHODS AND SYSTEMS FOR SHIFTING OBJECTS

TECHNICAL FIELD

The field relates to methods, systems, and apparatuses for shifting objects.

BACKGROUND

Engaging, supporting, and moving objects, such as wheeled objects, e.g., wheeled cargo trailers, while providing a desired level of maneuverability and control presents unique challenges and requires unique adaptations. This is particularly true for wheeled objects such as wheeled cargo trailers, the size of which may result in undetectable areas (e.g., "blind spots") forming around the vehicle that make detecting hazards or the environment challenging. Therefore, a system and method that facilitates the shifting of objects in a controlled and monitored fashion is needed.

SUMMARY

This summary is provided to introduce a selection of concepts in a simplified form that are further described below in the detailed description section of this disclosure. This summary is not intended to identify key or essential features of the claimed subject matter, nor is it intended to be used as an aid in determining the scope of the claimed subject matter.

In brief, and at a high level, this disclosure describes, among other things, systems, methods, and apparatuses for shifting objects, such as, for example, wheeled objects. In one aspect, the system includes a vehicle and at least one drone that are operated in coordination to facilitate the monitoring and/or control of an object being shifted. The wheeled objects referenced herein may be, for example, wheeled cargo trailers or another type of wheeled vehicle, structure, vessel, enclosure, etc. By shifting these wheeled objects using coordinated movement of a vehicle and at least one drone, the position, orientation, direction, and/or velocity, among other characteristics, of the wheeled object and/or the vehicle shifting the wheeled object may be dynamically monitored, allowing the shifting to be performed with greater accuracy and/or control.

In one embodiment hereof, a system for shifting wheeled objects is provided. The system includes a vehicle with a propulsion system, a coupling assembly for releasably attaching the vehicle to the wheeled object, and a first communication component. The system further includes at least one drone that has a drone propulsion system, at least one sensor, and a second communication component. The vehicle and the at least one drone may be adapted to communicate using the first communication component and the second communication component. Through this communication, the at least one drone and the vehicle can coordinate their movement relative to the wheeled object as the wheeled object is shifted by the vehicle.

In another embodiment hereof, a method for shifting wheeled objects is provided. The method includes positioning a vehicle at a first location. The vehicle comprises a vehicle propulsion system, a coupling assembly useable for releasably attaching the vehicle to the wheeled object, and a first communication component. The method further includes releasably attaching the coupling assembly to a coupling structure on the vehicle to releasably secure the vehicle to the wheeled object. The method further includes deploying at least one drone. The at least one drone includes a drone propulsion system, at least one sensor, and a second communication component. The method further includes shifting the wheeled object to a second location using the vehicle releasably secured to the wheeled object and detecting, using the at least one sensor of the deployed at least one drone, one or more characteristics of the wheeled object and/or of an environment surrounding the wheeled object while the wheeled object is being shifted by the vehicle. The method further includes communicating, from the second communication component to the first communication component, feedback comprising the one or more characteristics detected by the at least one sensor, and adjusting operation of the vehicle and/or the at least one drone based at least in part on the feedback.

In a third embodiment hereof, a system for shifting wheeled objects is provided. The system includes a vehicle with a vehicle propulsion system, a coupling assembly useable for releasably attaching the vehicle to the wheeled object, a first communication component, and at least one sensor coupled to the vehicle. The system also includes at least one drone with a drone propulsion system and at least one sensor coupled to the at least one drone, and a second communication component. The system also includes a computing device comprising one or more processors adapted to execute computer-executable instructions stored on one or more computer-readable media to perform a method of coordinating movement of the vehicle and the at least one drone relative to the wheeled object while the wheeled object is being shifted by the vehicle. The method further includes detecting a position of the wheeled object using the at least one sensor of the at least one drone, and communicating an instruction to the vehicle and/or the at least one drone to adjust a position of the vehicle and/or the at least one drone based on the position of the wheeled object.

BRIEF DESCRIPTION OF THE DRAWINGS

The present technology is described in detail herein with reference to the attached drawing figures, which are intended to represent non-limiting embodiments of the present technology, wherein.

DETAILED DESCRIPTION

The subject matter of the present technology is described with specificity herein to meet statutory requirements. However, the description itself is not intended to limit the scope of the invention. Rather, the claimed subject matter may be embodied in other ways, to include different elements, steps, and/or combinations of elements or steps, similar to the ones described in this disclosure, and in conjunction with other present or future technologies. Moreover, although the terms "step" or "block" may be used herein to connote different elements of various methods employed, the terms should not be interpreted as implying any particular order among or between various steps or blocks unless and except when the order of individual steps or blocks is explicitly described and required.

In brief, and at a high level, the present technology relates to mobile apparatuses, methods, and systems for shifting wheeled objects, such as wheeled cargo trailers, using drones, and/or using drones in combination with vehicles. In one embodiment, a system for shifting wheeled objects is provided that includes a vehicle and a drone which are adapted to communicate with each other using communication components. The system is adapted to utilize this communication capability to coordinate movement of the drone relative to the wheeled object during shifting, thereby providing greater accuracy, control, and coordination during the shifting process. In other disclosed embodiments, a method of shifting wheeled objects is provided that includes using a drone to detect characteristics of an environment surrounding the wheeled object while the wheeled object is being shifted. For example, the drone can communicate feedback that includes data related to one or more characteristics of the environment surrounding the wheeled object. The system may then adjust a position, orientation, and/or velocity of the vehicle and/or the wheeled object being shifted by the vehicle based on this feedback. This can provide greater control of the wheeled object during shifting and more accurate shifting. Examples of the aforementioned embodiments, as well as additional embodiments, are described in detail below with reference to FIGS. 1-9.

The subject matter of this disclosure may be provided as, at least in part, a method, a system, and/or a computer program product, among other things. Accordingly, certain aspects disclosed herein may take the form of hardware, or may be represented as a combination of software and hardware, and/or may be represented as a computer program that includes computer-useable instructions embodied on one or more computer-readable media. The subject matter hereof may also be implemented as hard-coded into the mechanical design of vehicle and/or drone components as described herein, and/or may be built into a computing device associated with systems for shifting objects and/or various components thereof as described herein.

Computer-readable media includes both volatile and non-volatile media, removable and non-removable media, and contemplate media readable by a database, a switch, and/or various other network devices. Network switches, routers, and related components are conventional in nature, as are methods of communicating with the same. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and/or other magnetic storage devices. These memory components may store data momentarily, temporarily, and/or permanently, and are not limited to the examples provided herein.

Throughout this disclosure, the word "shifting" is used and shall encompass, without limitation, the moving of objects, such as wheeled objects (e.g., trailers, vehicles, enclosures, and the like). For example, an object, such as a wheeled object, may be shifted, e.g., re-positioned, relocated, or moved, from a first location, such as a dock or parking area for example, to a second location, such as a loading, unloading, or other staging area in a logistics environment for example.

Additionally, throughout this disclosure, the terms "unmanned" and "autonomous" may be used in connection with various components, systems, and processes described herein, and shall refer, without limitation, to those components, systems, and processes being able to operate for at least a period of time without contemporaneous human control. This may apply, for example, to drones and/or vehicles described in certain embodiments herein. Additionally, unmanned systems as described herein may sometimes utilize a human to take control of the unmanned system or provide instructions to the unmanned system, and some unmanned systems may be controlled or partially controlled remotely by a human pilot. In certain embodiments, the unmanned systems may operate autonomously by receiving instructions from a computer program. Thus, to complete an objective, an unmanned system may operate autonomously, under the guidance of received instructions, or under partial or total control of a human operator. The word "drone" may be used interchangeably with "unmanned system" and may refer, without limitation, to a single component, or multiple components which may be separate and interconnected.

One example of an unmanned aerial system is an unmanned aerial vehicle ("UAV"), more commonly called a UAV or an aerial drone. The UAVs discussed and illustrated herein are generally depicted as four-rotor vertical takeoff and landing UAVs. However, this is not intended to be limiting in any way, and for the purposes of the embodiments contemplated herein, the referenced UAVs may include any type of propulsion system, guidance system, control system, communication system, and/or other system or component, or combination thereof. The UAVs described herein may also be embodied as fixed-wing aircraft, or some combination of both fixed wing aircraft and rotor-propelled aircraft.

One example of a terrestrial unmanned system is a terrestrial-based drone, more commonly called a terrestrial drone. The terrestrial drones discussed and illustrated herein are generally depicted as four-wheeled terrestrial drones. However, this is not intended to be limiting in any way, and these terrestrial drones may include any configuration of components, including different propulsion systems (e.g., wheels or tracks) and/or various different control systems, guidance systems, communication systems, and/or other systems and components adapted to support their drone functionality.

The autonomous vehicles and drones described herein may use sensor-obtained information to operate without human input or control, or with reduced human input or control. Sensor data may be collected by one or more sensors located on a drone and/or on an associated component of the drone (which may be local to the drone or remote). Some drones may utilize Light Detection and Ranging ("LIDAR") technology, radar technology, and/or other imaging and visual technology to obtain information about an environment in which the drone is operating, and/or to obtain information about a vehicle that is being shifted in the environment.

The present technology in one embodiment describes a vehicle and drone system capable of shifting wheeled objects. In some embodiments, the wheeled objects that are shifted are wheeled cargo trailers (e.g., of the type typically moved by a tractor that connects to the wheeled cargo trailer and utilizes a pneumatic braking system). In some embodiments, the vehicle and drone are autonomously operated. The drone and/or vehicle may utilize sensors that allow the drone and/or vehicle to coordinate movement of the drone, and/or the vehicle shifting the wheeled object, and thus by association the wheeled object itself. In this way, the system can shift the wheeled object while monitoring a position, orientation, and/or velocity of the wheeled object and/or the vehicle shifting the wheeled object, while also monitoring characteristics of the surrounding environment (e.g., the location of obstacles, the velocity and position of other vehicles, etc.). In additional embodiments, the drone and vehicle may utilize sensors on the vehicle to coordinate movement of the drone.

Figure 1:
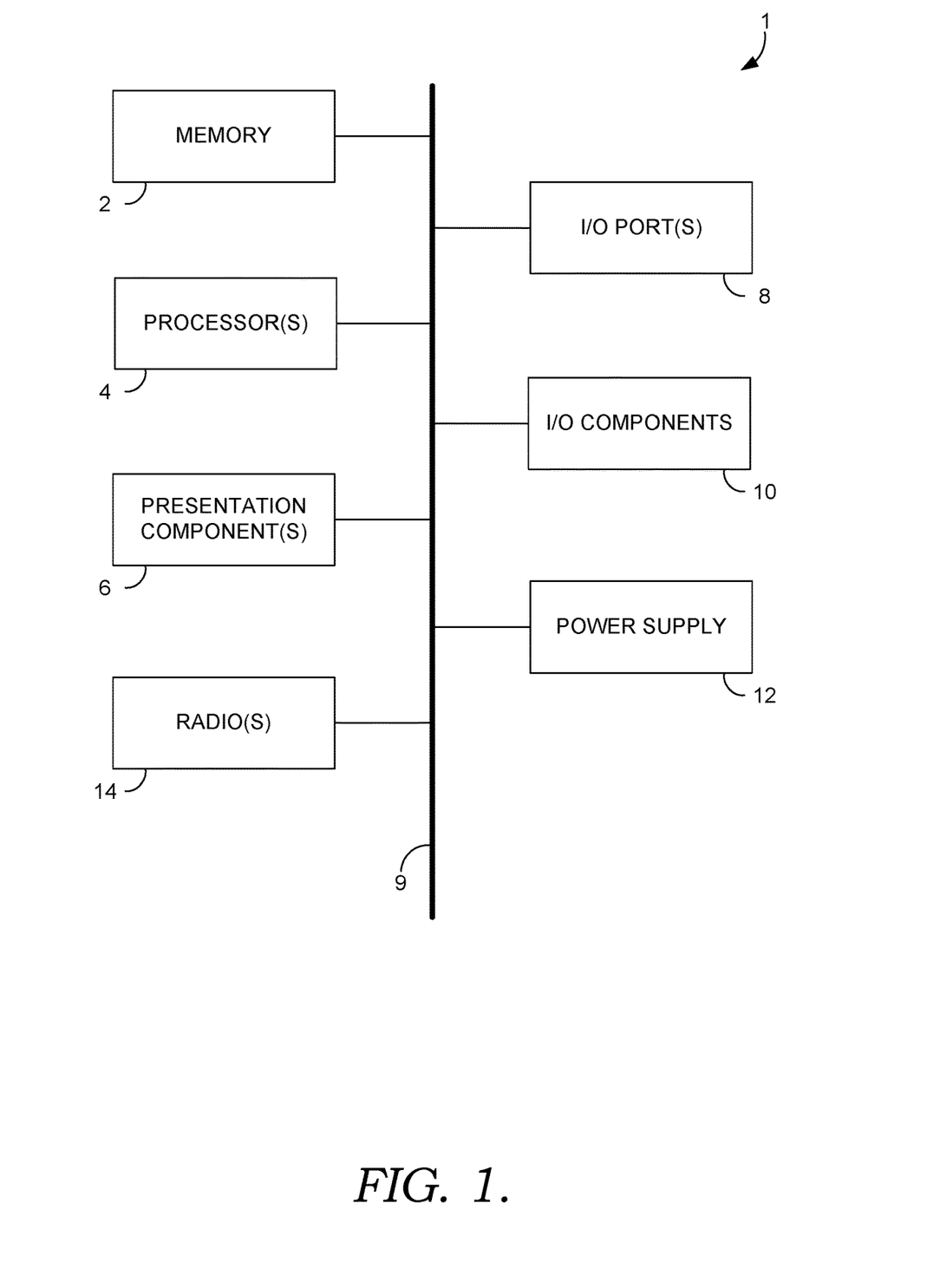
FIG. 1 depicts a block diagram of a computing system suitable for supporting various functions of the present technology.

Referring now to FIG. 1, a block diagram of an example computing device 1 suitable for enabling the operations and functions described herein is provided, in accordance with an embodiment of the present technology. It should be noted that although some components depicted in FIG. 1 are shown in the singular, they may be plural, and the components may be connected in a different, including distributed, configuration. For example, computing device 1 might include multiple processors and/or multiple radios. The computing device 1 shown in FIG. 1 includes a bus 9 that may directly or indirectly connect different components of the computing device 1 together, including memory 2, processor(s) 4, presentation component(s) 6 (if applicable), radio(s) 14, input/output (I/O) port(s) 8, input/output (I/O) component(s) 10, and power supply 12.

Different media suitable for enabling communication between components described herein are contemplated. Communication media typically embodies computer-readable instructions, data structures, program modules, or other data in a modulated data signal, such as a carrier wave, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of communication media.

The memory 2 may take the form of any of the memory components described herein. Thus, further elaboration will not be provided here, but it is contemplated that memory 2 may include any type of tangible medium that is capable of storing information, such as a database. A database may include any collection of records, data, and/or other information. In one embodiment, memory 2 may include a set of computer-executable instructions that, when executed, facilitate various functions or steps associated with the subject matter described herein. These instructions will be referred to herein as "instructions" or an "application" for short. The processor(s) 4 may actually be multiple processors that may receive instructions and process them accordingly. The presentation component 6 may include a display, a speaker, a screen, a portable digital device, and/or other components that can present information through visual, auditory, and/or other tactile cues (e.g., a display, a screen, a lamp, a light-emitting diode (LED), a graphical user interface (GUI), and/or a lighted keyboard).

The radio(s) 14 may facilitate communication with a network, and may additionally or alternatively facilitate other types of wireless communications, such as Wi-Fi, WiMAX, LTE, Bluetooth, and/or VoIP communications, among other communication protocols. In various aspects, the radio 14 may be configured to support multiple technologies, and/or multiple radios may be configured and utilized to support multiple technologies.

The input/output (I/O) ports 8 may take a variety of forms. Example IO ports may include a USB jack, a stereo jack, an infrared port, a firewire port, and/or other proprietary communication ports. The input/output (I/O) components 10 may include one or more keyboards, microphones, speakers, touchscreens, and/or any other item useable to directly or indirectly input data into the computing device 1. The power supply 12 may include batteries, generators, fuel cells, and/or any other component that may act as a power source to supply power to computing device 1 and to any other components described herein.

Figure 2:
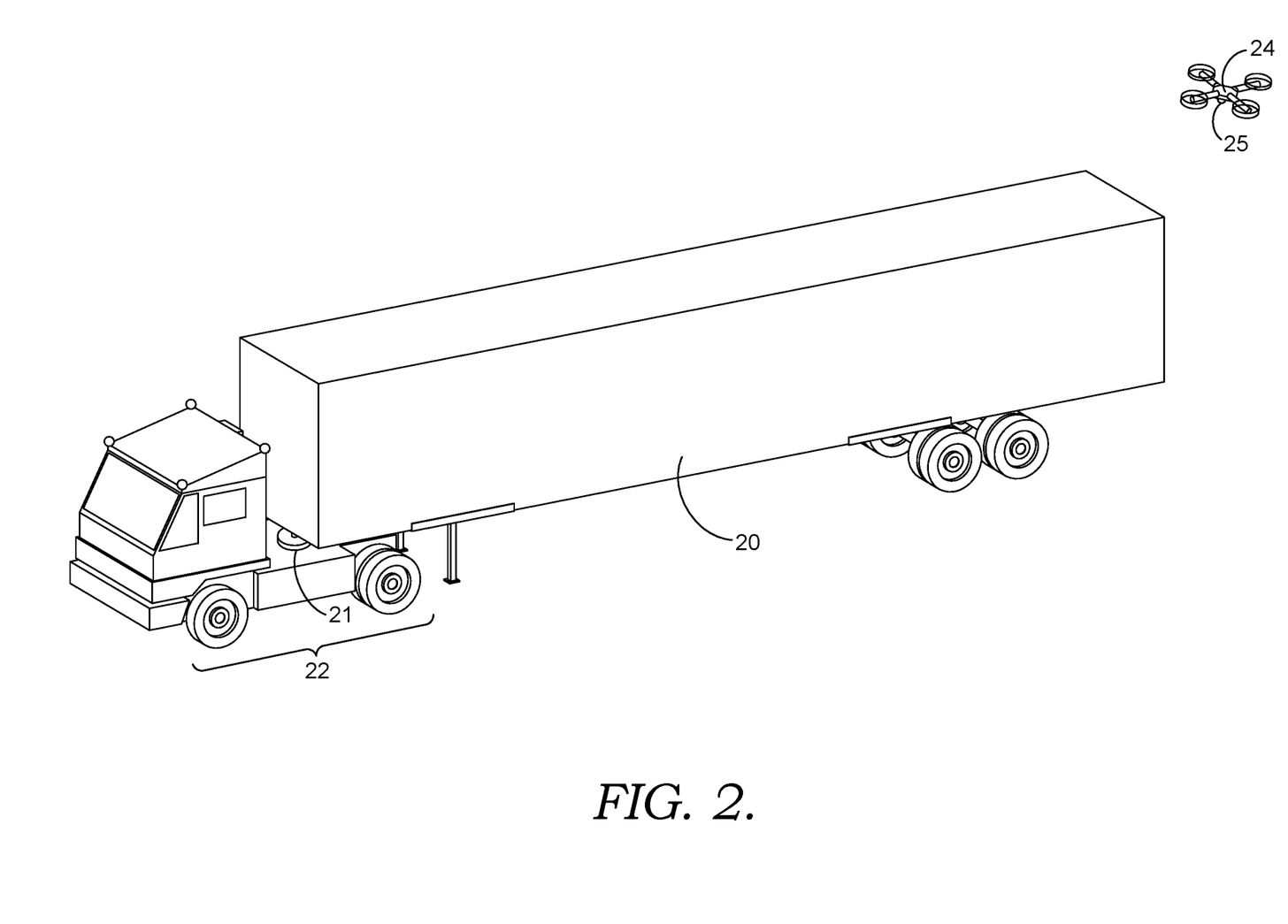
FIG. 2 depicts an example system used for shifting wheeled objects, in accordance with an embodiment of the present technology.

Referring now to FIG. 2, a vehicle 22 useable for shifting wheeled objects, such as for example the wheeled object 20 shown in FIG. 2, and an aerial drone 24 useable for guiding the vehicle 22 and/or the wheeled object 20 are depicted, in accordance with an embodiment of the present technology. The vehicle 22 includes a vehicle propulsion system useable for shifting the vehicle 22 to different locations. The vehicle propulsion system may include various components that facilitate movement and steering, such as a motor, a drive train, a steering column, a guidance system, and/or a control system, in addition to other possible components. The vehicle 22 also may include a coupling assembly 21 for releasably attaching the vehicle 22 to the wheeled object 20. In some embodiments, the coupling assembly 21, depicted in one non-limiting form in FIG. 2, may be a fifth wheel configured to receive a fifth wheel pin located on a wheeled object.

The example vehicle 22 shown in FIG. 2 also includes a communication component. The communication component may utilize any communication protocol that enables the vehicle 22 to communicate with another component and/or computing device, such as one associated with the aerial drone 24 for example. The communication component may also enable communication with multiple drones and/or computing devices. The communications can be facilitated utilizing wired or wireless communications, and can employ any short or long-range communications technology including, but not limited to, LANs, WANs, Ethernet, the Internet, WiFi, Bluetooth, NFC, optics (e.g., QR codes, Infrared), Zigbee, radio, RFIDs, and the like.

The aerial drone 24 shown in FIG. 2 is an example of a drone that can be used with the vehicle 22 for shifting the wheeled object 20 or other objects in contemplated embodiments. More specifically, the aerial drone 24 can be used in tandem with the vehicle 22 to monitor conditions of the vehicle 22 and/or the wheeled object 20, such as the position, orientation, and/or velocity of the same. The aerial drone 24 may further be able to monitor characteristics of the environment surrounding the vehicle 22 and/or the wheeled object 20, such as the position of obstacles, traffic, other vehicles, and/or other environmental aspects. The aerial drone 24 may assist in positioning or guiding the vehicle 22 and/or the connected wheeled object 20 through the use of at least one sensor 25 located on the drone 24, which provides the aforementioned feedback to the vehicle 22. The aerial drone 24 may use the sensor 25 to monitor characteristics of the environment surrounding the vehicle. The aerial drone 24 is able to communicate with the vehicle 22 using a communication component that is adapted to communicatively connect with a communication component located on the vehicle 22. The aerial drone 24 provides feedback obtained by the sensor 25 that relates to the environment surrounding the vehicle 22. The feedback can be used to guide the movement of the vehicle 22 and by association the wheeled object 20. Further, the vehicle 22 and the aerial drone 24 can be adapted to communicate with each other and move in coordination, allowing the drone 24 to follow and/or otherwise adjust its position to monitor the vehicle 22 and/or wheeled object 20 as needed.

The vehicle 22 and/or the aerial drone 24 may include various computer components, processors, and/or memories that facilitate the various operations of the aerial drone 24 and vehicle 22, and may also include the communication components that facilitate communication and coordination of the drone 24 and the vehicle 22. The aerial drone 24 shown in FIG. 2 further includes a drone propulsion system that allows the aerial drone 24 to move to different locations. This movement may be guided autonomously or with some degree of human input. In the example embodiment shown in FIG. 2, the drone propulsion system includes four motors each having a respective propeller that provides lift to the aerial drone 24 when in operation. It is contemplated that many other configurations of a drone or drones may be used in different embodiments to guide or track the shifting of one or multiple objects.

In some embodiments, the aerial drone 24 may be autonomous. In embodiments where the aerial drone 24 is autonomously controlled or operated, the aerial drone 24 may have at least one sensor 25 that is used to monitor the environment around the aerial drone 24 and/or guide the aerial drone 24 to avoid hazards such as, for example, power lines, trees, buildings, etc. Multiple sensors may also be employed with an autonomous drone to monitor the environment around the drone or the environment around the object being shifted. For example, looking at FIG. 2, using the drone 24 and sensor(s) 25 thereof, the wheeled object 20 can be shifted with greater knowledge of the locations of hazards in the environment (e.g., obstacles, vehicles, other shifter vehicles, etc.). This monitored shifting may allow for objects to be shifted with greater efficiency, and with less encountering of hazards.

In some embodiments, the aerial drone 24 may be tethered to the wheeled object 20 (e.g., wirelessly using a communications link, or through a hard-wired connection). Further, the aerial drone 24, when untethered, may operate using an internal power source that must be replenished periodically. In other words, when the aerial drone 24 is untethered, the drone must return periodically to a certain location so that the internal power source can be replenished or exchanged, which can limit the time spent monitoring object shifting. It is envisioned in some embodiments that the aerial drone 24 may be tethered to the wheeled object 20 to provide a continuous power source to the aerial drone 24. In these embodiments, a cable (e.g., a tether) may hang from the aerial drone 24 and may be connected to the vehicle 22 and/or the wheeled object 20. The cable may transfer power and/or communications data between the vehicle 22 and the aerial drone 24. With the cable, the aerial drone 24 may stay in a position where it can monitor the environment surrounding the wheeled object 20 continuously as needed.

The vehicle 22 and the aerial drone 24 are adapted to communicate using an integrated communication system. This communication system may include, for example, a first communication component located on the vehicle 22 or the aerial drone 24 and a second communication component located on the other of the vehicle 22 and the aerial drone 24. This communication may be wireless communication that is facilitated by one or more transmitting and receiving components, e.g., antennas, and one or more radios operating in conjunction with the same, for example.

The vehicle 22 and the aerial drone 24 may further be adapted to coordinate movement of the drone 24 relative to the wheeled object 20 as the wheeled object 20 is shifted by the vehicle 22. For example, using the communication components described above, the vehicle 22 and/or the aerial drone 24 can control their positions relative to the wheeled object 20 in contemplated embodiments. For example, coordinated movement of the vehicle 22 and the aerial drone 24 may allow the aerial drone 24 to maintain a relative position, orientation, distance, and/or height relative to the wheeled object 20. In another example, the aerial drone 24 may maintain a velocity based on the speed of the wheeled object 20 and/or the vehicle 22 shifting the wheeled object 20. This maintaining of velocity may be facilitated using feedback from one or more sensors on the vehicle 22 and/or the aerial drone 24. In this way, the aerial drone 24 and the vehicle 22 may effectively shift the wheeled object 20 in tandem, with the aerial drone 24 enabling greater visibility and avoidance of the surroundings of the vehicle 22 during such shifting.

Figure 3:
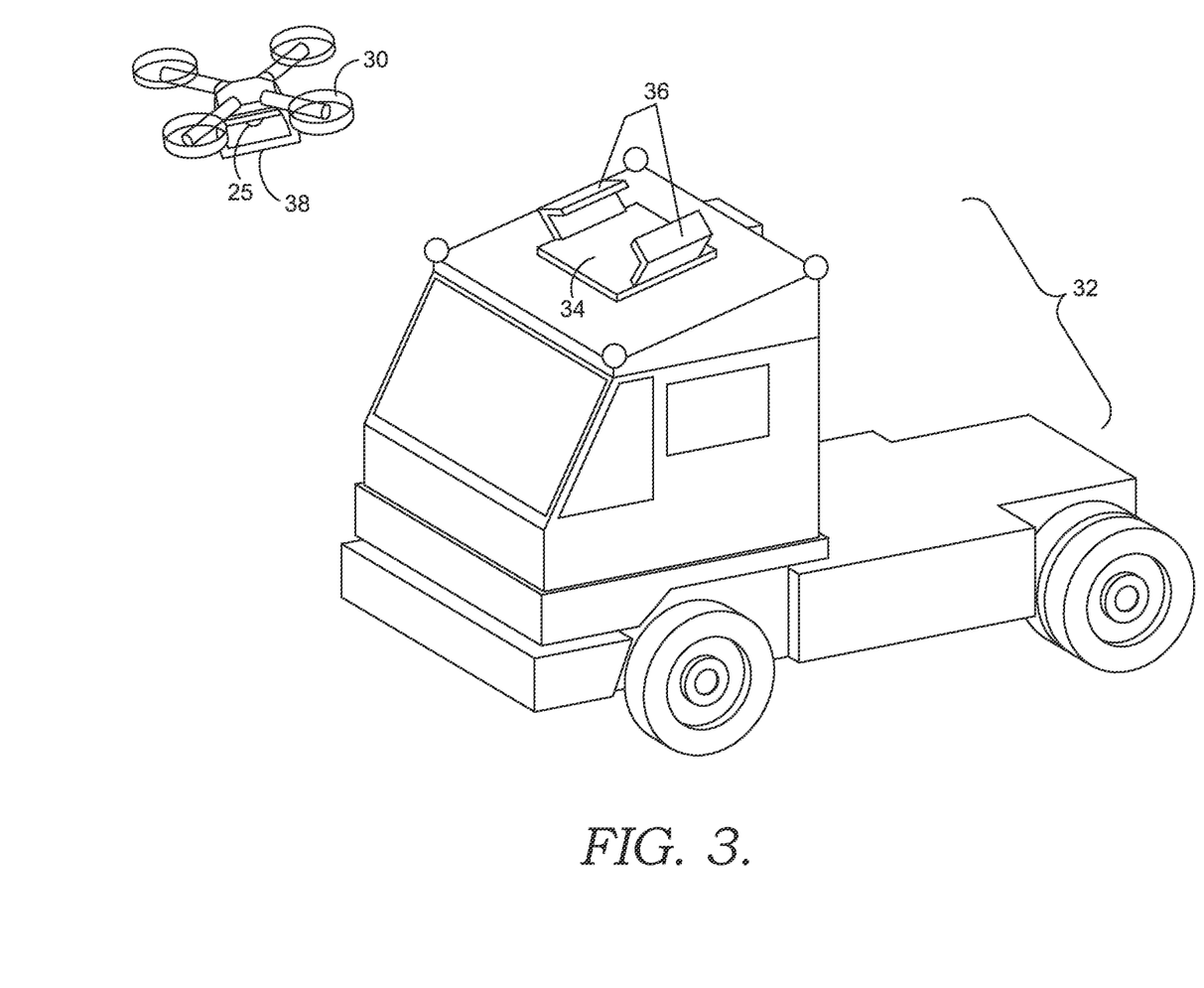
FIG. 3 depicts an example configuration for launching a drone from a vehicle, in accordance with an embodiment of the present technology.

Referring now to FIG. 3, an aerial deployment drone 30 and a first drone deployment vehicle 32 are depicted, in accordance with an embodiment of the present disclosure. The first drone deployment vehicle 32 is depicted with a landing assembly 34 located on the first drone deployment vehicle 32. The landing assembly 34 is depicted having a support structure 36. The drone 30 is depicted with a landing gear 38. The support structure 36 may be any structure useable for engaging and/or supporting the landing gear 38 and/or the drone 30. As depicted, the support structure 36 may comprise mechanical clasps for engaging a corresponding structure on the aerial deployment drone 30. Other mateable structures for engaging, supporting, and retaining a drone on a vehicle are contemplated herein.

In some embodiments, the aerial deployment drone 30 is deployed from the landing assembly 34 located on the vehicle. This landing assembly 34 may deploy the aerial deployment drone 30 when the vehicle 32 releasably attaches to a wheeled object, such as the wheeled object 20 (e.g., as shown in FIG. 2). This deployment may be initiated by a computing device associated with the vehicle 32. In some embodiments, the deployment may be automatic based on features or conditions detected by sensors on the vehicle 32, or based on the detection of features or conditions by external sensors of a separate monitoring system (e.g., remote from the vehicle 32). In additional instances, when a sensor associated with the vehicle 32 detects a hazard while shifting an object, or another condition is present (e.g., other vehicles, traffic, or a communication indicating a hazard is received) the drone 30 may be deployed to provide greater visibility.

In any embodiment contemplated herein, the deployment of a drone or drones may occur in response to various conditions or circumstances. For example, the detection of a blind spot around an object being shifted by a sensor on a shifter vehicle may initiate deployment of one or more drones. Or, the start of vehicle shifting may initiate deployment of one or more drones. Or, the detection or receiving of a process action may initiate the deployment of one or more drones. The "process action" may be a communication that initiates or indicates a shifting is going to occur (e.g., "begin backing" or "begin shifting," etc.) or that initiates or indicates a certain shifting process is going to occur (e.g., shift object to a pre-determined location X, Y, or Z for example).

Figure 4:
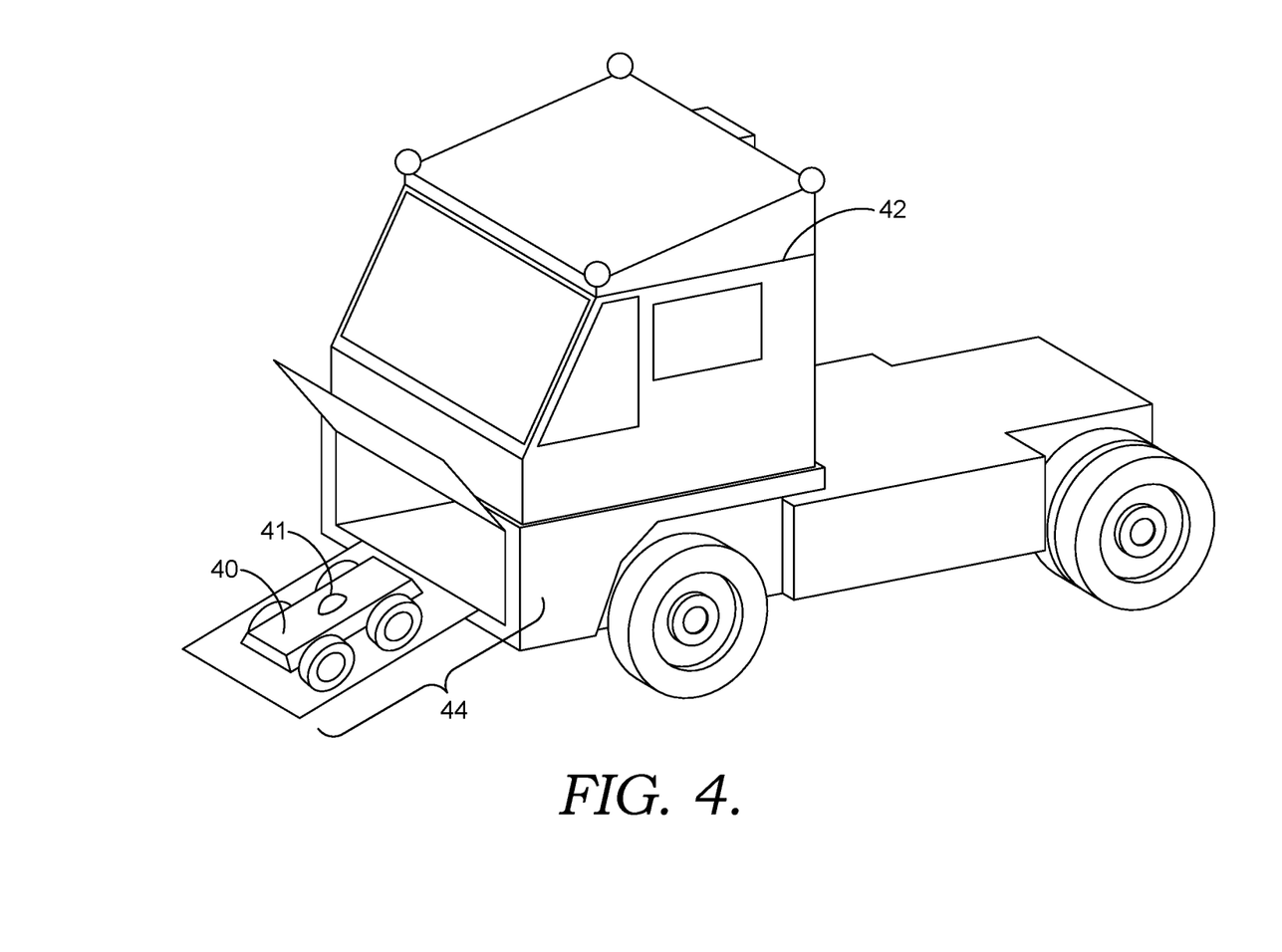
FIG. 4 depicts another example configuration for launching a drone from a vehicle, in accordance with an embodiment of the present technology.

Referring now to FIG. 4, an example of a terrestrial-based drone 40 having a sensor 41, with the drone 40 deploying from a drone deployment vehicle 42, is depicted, in accordance with an embodiment of the present technology. The terrestrial-based drone 40 is configured such that it can move and operate across a surface, and as mentioned above, may be configured to operate autonomously. The terrestrial-based drone 40 is depicted with four wheels, but may utilize any propulsion system and components of the same, such as one including wheels or tracks. The terrestrial-based drone 40 is shown in FIG. 4 deploying from a terrestrial-based landing assembly 44 located on the drone deployment vehicle 42. The terrestrial-based landing assembly 44 is depicted as a compartment within the drone deployment vehicle 42, but may be any type of support structure, enclosure, compartment, and/or launching platform or other component or combination of components that supports and/or engages and retains the terrestrial-based drone 40. The terrestrial-based landing assembly 44 in this embodiment also includes a ramp for the terrestrial-based drone 40 to deploy from an elevated position from the drone deployment vehicle 42.

Figure 5:
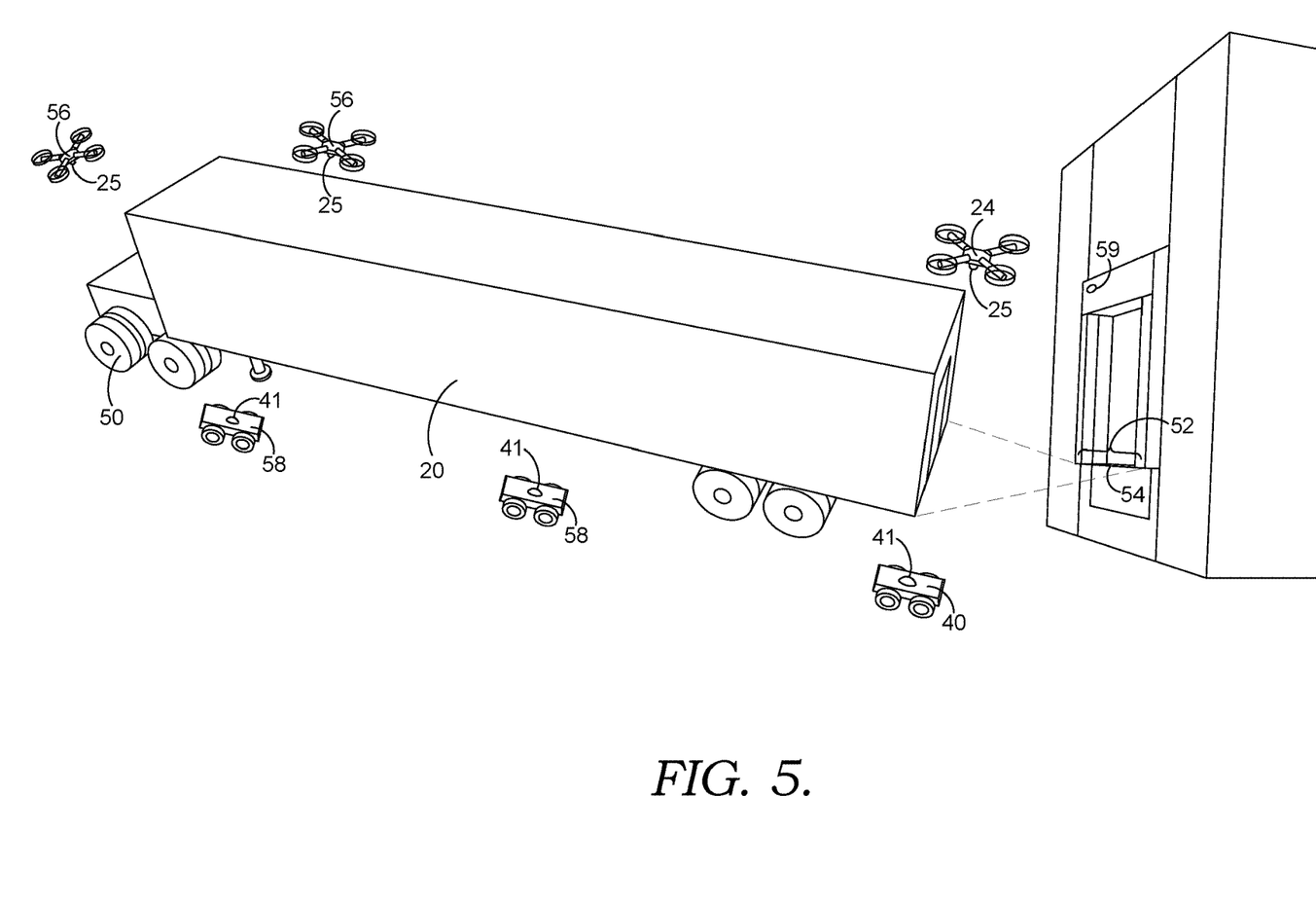
FIG. 5 depicts an example process of shifting a wheeled object using one or more drones operating in coordination with a vehicle that is shifting the wheeled object, in accordance with an embodiment of the present technology.

Referring now to FIG. 5, an example of the shifting of a wheeled object using one or more drones operating in conjunction with a shifter vehicle is depicted, in accordance with an embodiment of the present technology. Looking at FIG. 5, in some embodiments, a drone, or multiple drones, may be deployed to assist the shifting of a wheeled object 20 by a vehicle 50. For example, when shifting a wheeled object like a cargo trailer to position it against a dock 54, it can be difficult under traditional methods to sense the environment surrounding the cargo trailer. It can be especially challenging for a human operator of the vehicle to shift the cargo trailer due to physical restraints, e.g., difficulty seeing and difficulty determining distance. Deploying a drone to detect blind spots 52 and/or areas that are hard to detect from the autonomous vehicle 50 is therefore advantageous and an improvement to the technology in the field.

With continued reference to FIG. 5, the wheeled object 20 shown in FIG. 2 is depicted with the terrestrial-based drone 40 and the aerial drone 24 in use, helping to guide the wheeled object 20 towards a particular location (e.g., the dock 54). The wheeled object 20 is being shifted by the vehicle 50 which may in aspect be autonomously operated. The autonomous vehicle 50 may include one or more sensors for sensing the environment around the wheeled object 20. However, in some embodiments, due to the size of the wheeled object 20 and the location of the autonomous vehicle 50, the one or more sensors may not be sufficient to detect substantially the entire area around the wheeled object 20. The areas around the wheeled object 20 where one or more sensors of the autonomous vehicle 50 may not be able to sense the environment are shown in FIG. 5 as blind spot 52.

The blind spot 52 may be sensed by the at least one sensor 25 of the drone 24. As depicted in FIG. 5, the terrestrial-based drone 40 and/or the aerial drone 24 may be positioned or guided so that the at least one sensor 25 can detect and monitor the blind spot 52. Information and/or environmental characteristics sensed at the blind spot 52 by the aerial drone 24 may be communicated to the autonomous vehicle 50 as feedback. For example, the communication component located on the drone 24 may communicate the feedback obtained by the sensor 25 of the drone 24 to a communication component located on the autonomous vehicle 50. This feedback about the environment surrounding the wheeled object 20 may include information about the blind spot 52, e.g., a three-dimensional characteristic or topography of the blind spot 52. The autonomous vehicle 50 may shift the wheeled object 20 based on the feedback. For example, the autonomous vehicle 50, based on the feedback received from the drone about the blind spot 52, may shift the wheeled object 20 a certain distance or in a certain direction based on the feedback. In some embodiments, the vehicle may sense the blind spot 52 and automatically deploy one or more drones to a position where feedback on the blind spot 52 can be obtained and communicated to the autonomous vehicle 50.

For example, when the autonomous vehicle 50 has the blind spot 52 or another blind spot, the aerial drone 24 or the terrestrial-based drone 40, or another drone or combination of drones, may be positioned relative to the wheeled object 20 and/or maintain a speed and position that allows feedback on the blind spot 52 to be provided to the autonomous vehicle 50. In this case, the position of the at least one sensor 25 of the drone would be oriented to sense the blind spot 52. Continuing with the example, the aerial drone 24 may provide a feedback useful when the wheeled object 20 is backed up to the dock 54 where it can be difficult to sense the environment surrounding the wheeled object 20.

With continued reference to FIG. 5, the autonomous vehicle 50 may be shifted using aerial drones 56 in addition to the aerial drone 24, as well as in addition to terrestrial drones 58. Each of the additional aerial drones 56 and terrestrial drones 58 may include sensors 25 and sensors 41, respectively, which can be used for monitoring conditions as described herein. Using a plurality of drones, feedback may be collected on multiple areas around the wheeled object 20. This may include areas not detectable by some of the drones 24, 56, 58 in operation, but detectable by others. The use of a plurality of drones may therefore allow for additional blind spots to be monitored during a shifting process. This may further allow for adaption based on object size or geometry. For example, larger objects with more blind spots can be effectively monitored during shifting by using the number of drones necessary to provide adequate vantage points.

It should be noted that in additional contemplated embodiments, a plurality of drones may interact as a mesh network of sensors to coordinate the movement and positioning of a wheeled object, a shifter vehicle, and/or the plurality of drones themselves. In this way, each drone may communicate feedback from one or more sensors associated with the drone to other drones or vehicles directly or indirectly. As such, the plurality of drones may operate as a "swarm network" that share and utilize data across the drones to provide the most effective monitoring. The use of a plurality of drones can provide redundant or additional feedback about the environment surrounding the wheeled object that is being shifted as well.

The plurality of drones operating together may be positioned relative to a wheeled object so that those drones maintain a speed and position that allows for dynamically providing feedback on one or more blind spots of the wheeled object being shifted. This includes detecting newly formed blind spots. The plurality of drones may be positioned to maintain a specific distance or range of distances from the wheeled object and/or other drones. The plurality of drones may also remain in a fixed position relative to the ground, where feedback from the stationary drones can be communicated to a shifter vehicle. In other embodiments, a threshold number of drones may be needed to monitor an object being shifted, such that although some drones may not be in position to adequately monitor blind spots, if a certain number of other drones are capable of monitoring, the shifting may be facilitated on this basis, or more drones may be deployed or re-positioned.

In some other embodiments, additional sensors may be placed on objects that are not terrestrial or aerial drones to provide the monitoring described herein. This may include fixed or movable sensors. For example, the additional sensors may be placed on buildings, light posts, telephone poles, or even forklifts and autonomous sweepers, for example, among other locations. FIG. 5 shows how one additional sensor 59 can be positioned on a building where a shifted object is frequently moved (e.g., to access the dock 54 as shown in FIG. 5). The additional sensor 59 can be useful for areas where blind spots 52 are known. In this way, additional sensors 59 can provide feedback to the drone and/or the autonomous vehicle 50 about the environment surrounding an object being shifted, such as the wheeled object 20. The additional sensors may also work with one or a plurality of drones to create a mesh network of feedback to coordinate movement of the drone(s), the shifter vehicle, and/or the wheeled object.

In other embodiments, a control device may be used with one or more processors configured to control operation of the shifter vehicle and one or more drones used to monitor the shifting. In some embodiments, the control device may be part of the shifter vehicle, e.g., the vehicle 50. The control device may control the terrestrial-based drone 40 and/or the aerial drone 24, or other drones, when such drones are used. The control device may also control additional aerial drones 56 and additional terrestrial drones 58, or other drones when used. The control device may include a communication component adapted to communicate the communication component of at least one drone, as well as sensors placed at fixed locations, such as the sensor 59 shown in FIG. 5. The control device may adjust the speed of the drone relative to the wheeled object as the wheeled object is shifted by the vehicle, may control a location of the drone, may control deployment and recalling of the drones, and the like.

Figure 6:
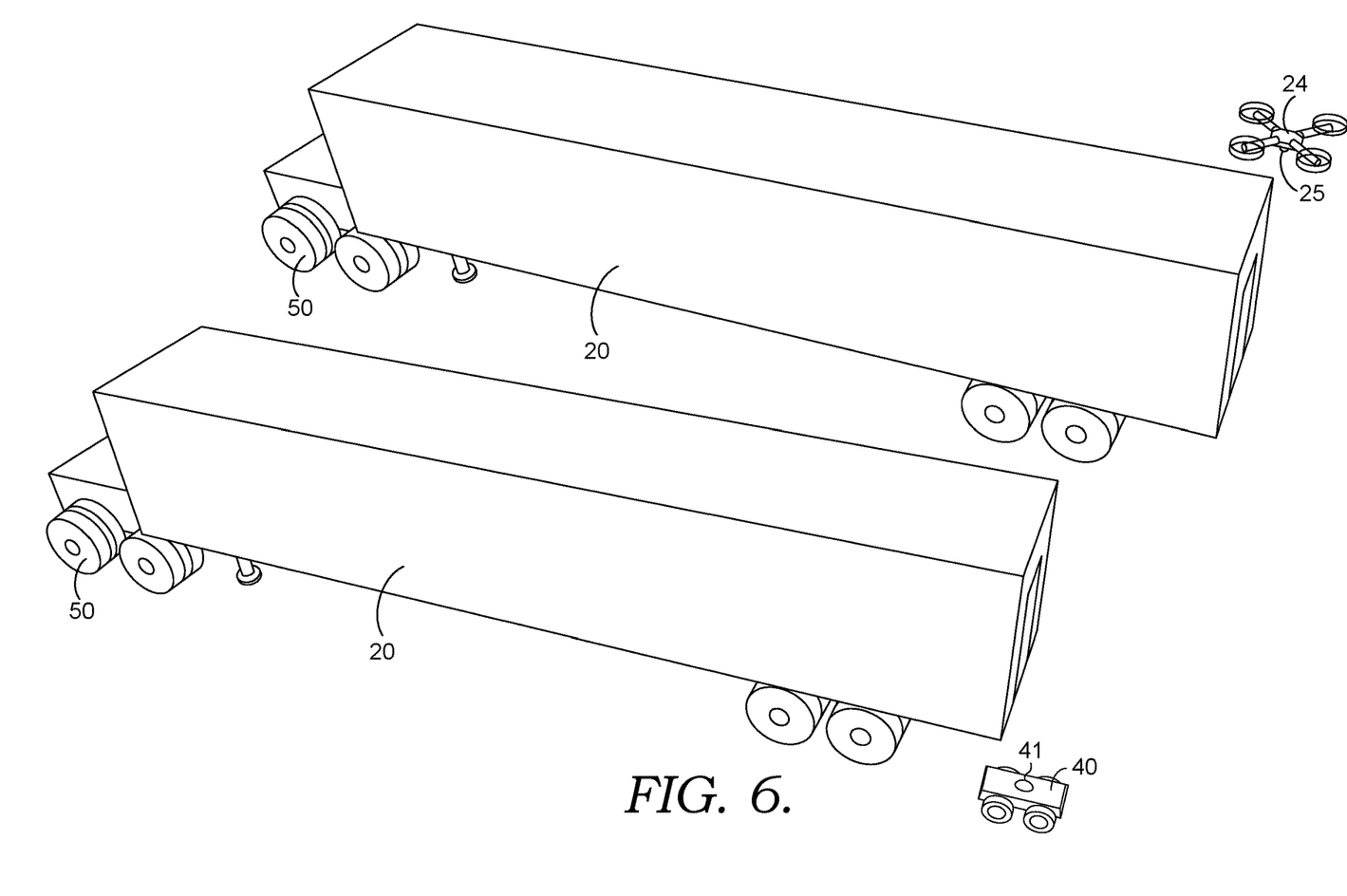
FIG. 6 depicts an example system for shifting multiple wheeled objects simultaneously, in accordance with an embodiment of the present technology.

FIG. 6 depicts an example of a system used for shifting multiple wheeled objects simultaneously, in accordance with an embodiment of the present technology. When multiple wheeled objects 20 are being shifted by corresponding vehicles 50 as shown in FIG. 6, one or multiple drones 24 may be deployed and used to monitor the shifting and provide feedback on the area surrounding the wheeled objects 20, as described herein. For example, two or more wheeled objects 20 may be tracked by one or more aerial drones 24 and/or one or more terrestrial-based drones 40, or some combination of the same. In these embodiments, the drone(s) may be positioned relative to the plurality of wheeled objects 20 so that they maintain a speed and position relative to the wheeled objects 20 that allows the drone(s) to provide feedback on the environment surrounding the vehicles 50 and/or the wheeled objects 20, or that allows the drone(s) to monitor the position, velocity, and/or orientation of the wheeled objects 20 during shifting. The drone(s) may also maintain this position by shifting automatically in accordance with the shifting of the plurality of wheeled objects 20. The drones 24 and/or 40 may provide feedback to the vehicles 50, allowing the shifting to be adjusted as needed. It should be noted that although one aerial drone 24 and one terrestrial drone 40 are shown in FIG. 6, more or fewer of each are contemplated herein in different embodiments.

Figure 7:
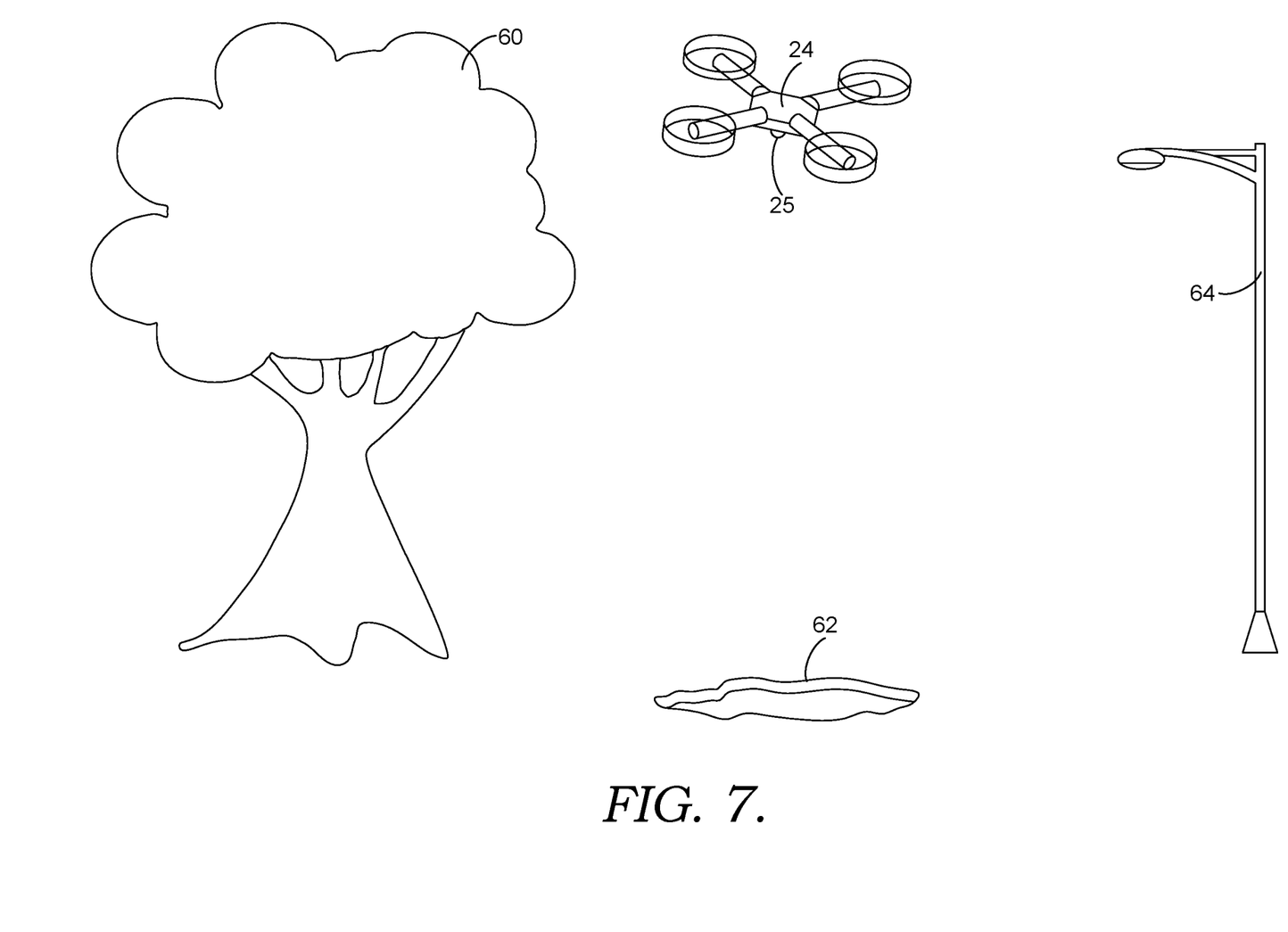
FIG. 7 depicts a drone used for monitoring an object being shifted, the drone monitoring and/or detecting various environmental characteristics, in accordance with an embodiment of the present technology.

FIG. 7 depicts example environmental characteristics that may be sensed by at least one sensor of a drone and/or a vehicle used in tandem to shift a wheeled object. When detecting the environment surrounding a wheeled object (e.g., as shown in FIG. 5), a sensor of either a drone and/or a vehicle may detect various surfaces, objects, and structures, such as, for example, a tree 60, a pot hole 62, other wheeled objects, or a lamp 64, for example. In some embodiments in which multiple drones are used, a sensor, such as the sensor 25 shown in FIG. 7, from the drone may sense other drones, like the aerial drone 24 or a terrestrial-based drone 40 (shown in FIG. 5). In some embodiments, the vehicle may also sense drones in the environment surrounding the wheeled object using its own sensors.

Figure 8:
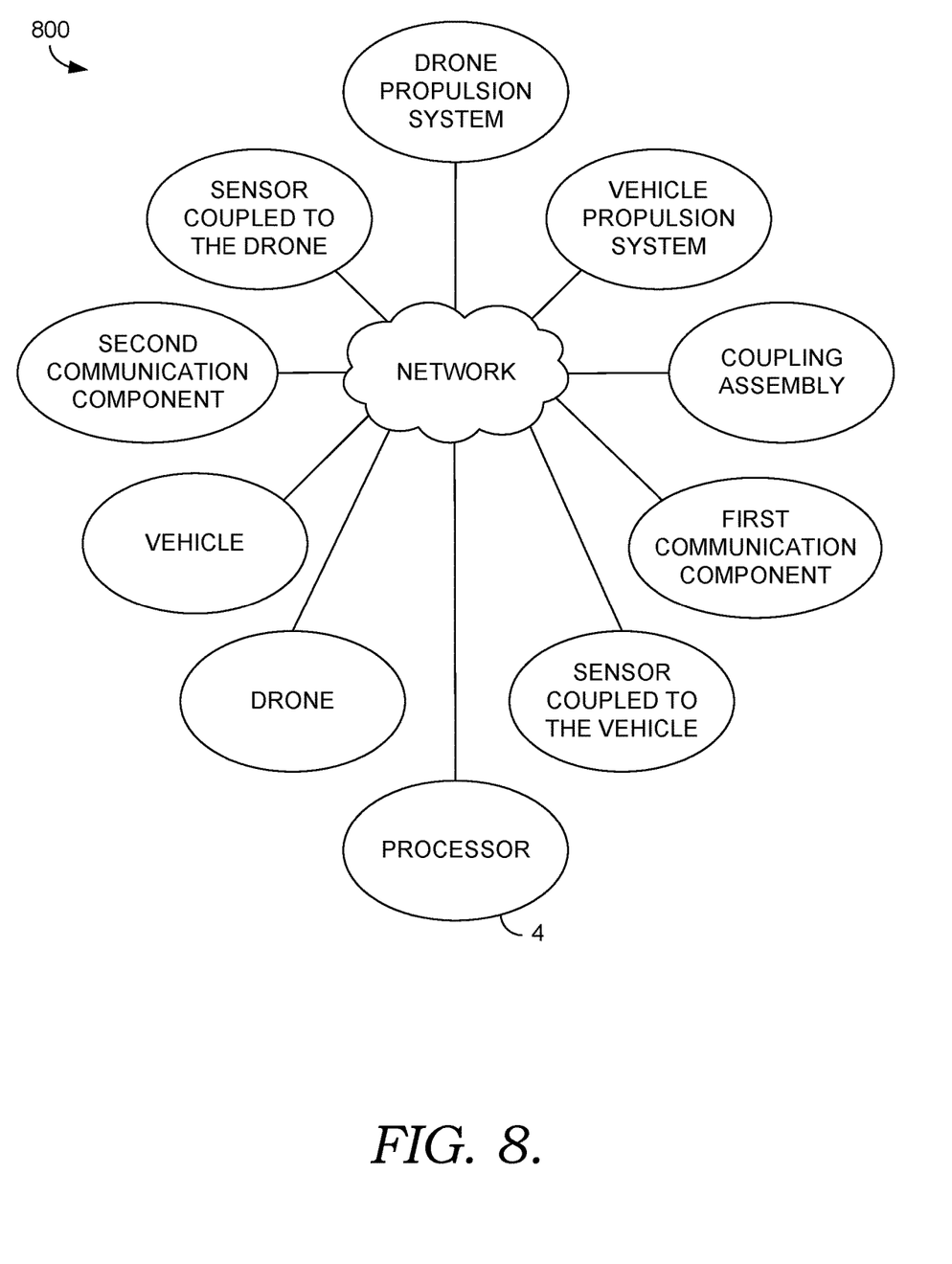
FIG. 8 is an example network diagram depicting the interconnection of various components, systems, and apparatuses that may be utilized for shifting wheeled objects as described herein, in accordance with an embodiment of the present technology.

FIG. 8 is a network diagram depicting an example selection of components suitable for supporting the shifting of a wheeled object using a vehicle and a drone as described herein, in accordance with an embodiment of the present technology. FIG. 8 in particular shows a diagram 800 depicting the interconnection of the various components utilized. The components can be connected to each other over the network which may be local or distributed. The processor(s) 4 may be connected to a vehicle used for shifting objects, a vehicle propulsion system thereof, a coupling assembly thereof, a communication component thereof, and/or at least one sensor coupled to the vehicle via the network. The processor(s) 4 may also be connected to a drone, a drone propulsion system thereof, drone sensor thereof, and a communication component thereof via the network. The processor(s) 4 may execute code adapted to control the speed, position, and/or orientation of the drone based on the speed, position, and/or orientation of the wheeled object(s) being shifted. The processor(s) may also be adapted to facilitate communication of instructions to the drone, e.g., related to drone control or drone deployment.

Figure 9:
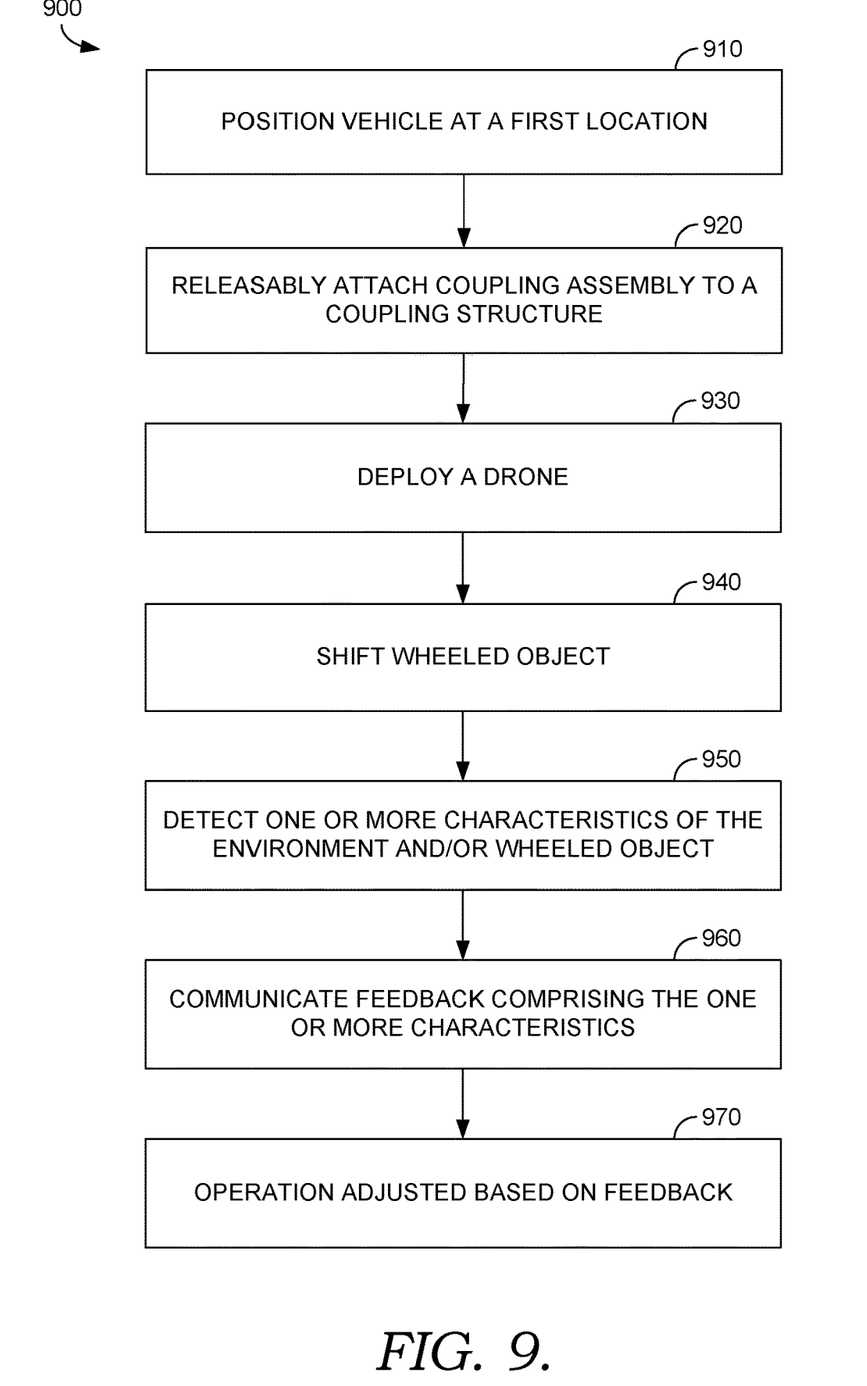
FIG. 9 is a block diagram representing one example method of shifting a wheeled object, in accordance with an embodiment of the present technology.

FIG. 9 is a block diagram showing one example method 900 of shifting wheeled objects, such as the wheeled object 20 shown in FIG. 2, using a vehicle and a drone, such as the vehicle 22 and the drone 24 shown in FIG. 2, in accordance with an embodiment of the present technology. At block 910, a vehicle is positioned at a first location. The vehicle may include a coupling assembly, such as the coupling assembly 21 shown in FIG. 2, useable for releasably attaching the vehicle to the wheeled object and may also include a first communication component. The vehicle may also include a propulsion system. At block 920, the coupling assembly is releasably attached to a coupling structure on the vehicle to releasably secure the vehicle to the wheeled object. At block 930, a drone is deployed. The drone may comprise a drone propulsion system, at least one sensor, and a second communication component. In some embodiments, the vehicle may comprise at least one sensor configured to detect an area surrounding the wheeled object. In embodiments where the vehicle comprises at least one sensor, the sensor may detect a blind spot (for example by determining there is an area where the vehicle is moving to that the sensor can't detect) and may deploy the drone in response to identifying the blind spot. In other embodiments, the vehicle may detect or receive information that the object is being shifted and may deploy the drone at that time.

At block 940, the wheeled object is shifted to a second location using the vehicle releasably secured to the wheeled object. At block 950, one or more characteristics of the wheeled object and/or the environment surrounding the wheeled object being shifted by the vehicle are detected by at least one sensor of the deployed drone. In some embodiments, the characteristics detected may be a live map of the environment and any obstacles that may impede shifting the wheeled object. In some embodiments, the feedback may be proximity alerts to hazards, or any combination of detectable information by the one or more sensors. In some embodiments the characteristics may include one or more of a position of the wheeled object, a speed of the wheeled object, and a direction of movement of the wheeled object. In some further embodiments, where the vehicle comprises at least one sensor configured to monitor the area surrounding the wheeled object, the position of the drone is shifted so that the at least one sensor of the drone can detect an area surrounding the wheeled object that is not detected by the at least one sensor of the vehicle.

At block 960, feedback is communicated from the second communication component which may be from the drone. The feedback may include the one or more characteristics detected by the at least one sensor of the drone. At block 970, the vehicle and/or the drone's operation is adjusted based at least in part on the feedback. For example, at least one drone may detect one or more characteristics in the environment surrounding a wheeled object being shifted. The characteristics in the environment may include one or more hazards. The feedback may then be communicated from the drone via the second communication component. The feedback may be received by the first communication component on the vehicle. Then, operation of the vehicle may be adjusted. In some aspects, the operation of the vehicle may be to shift the wheeled object to avoid hazards identified by the at least one sensor of the drone.

In some embodiments the method may further include adjusting the speed of the vehicle and/or the drone relative to the wheeled object as the wheeled object is shifted by the vehicle. The speed of the vehicle and/or wheeled object may need to be increased or decreased in order to avoid hazards or to slowly place the wheeled object against one or more structures (e.g., a loading dock).

In some embodiments, the method further includes positioning the wheeled object at a second location, and retrieving the deployed drone to a landing position. In these embodiments, the drone may be positioned to identify hazards in the environment of the second location. This information about the environment of the second location may be communicated as feedback. The feedback may be received by the vehicle and used to alter the operation to avoid any hazards at the second location. Once the vehicle is at the second location, the deployed drone may then return to a landing position on or at the vehicle or another location.

The present technology has been described in relation to particular embodiments, which are intended in all respects to be illustrative rather than restrictive. Many different arrangements of the various components depicted, as well as use of components not shown, are possible without departing from the spirit and scope of the present disclosure. Alternative aspects will become apparent to those skilled in the art that do not depart from the scope. It will be understood that certain features and subcombinations are of utility and may be employed without reference to other features and subcombinations and are contemplated as within the scope of the claims.

What is claimed is:

1. A system for shifting wheeled objects, the system comprising:
 a vehicle, comprising:
  a vehicle propulsion system,
  at least one vehicle sensor,
  a coupling assembly for releasably attaching the vehicle to a wheeled object, and
  a first communication component; and
 at least one drone, comprising:
  a drone propulsion system,
  at least one drone sensor, and
  a second communication component;
 wherein the vehicle and the at least one drone are adapted to communicate using the first communication component and the second communication component and coordinate movement of the at least one drone relative to the wheeled object as the wheeled object is shifted by the vehicle based on data collected by the at least one vehicle sensor and the at least one drone sensor of the at least one drone; and
 wherein the at least one drone is deployed in response to the at least one vehicle sensor identifying a blind spot around the wheeled object, and wherein the at least one drone is positioned so that the at least one drone sensor of the at least one drone monitors the blind spot while the wheeled object is being shifted.

2. The system of claim 1, wherein the wheeled object is a wheeled cargo trailer, wherein the vehicle is an autonomously operated vehicle.

3. The system of claim 2, wherein the at least one drone sensor of the at least one drone is configured to detect one or more of a position of the wheeled cargo trailer, a velocity of the wheeled cargo trailer, and a direction of movement of the wheeled cargo trailer.

4. The system of claim 2, wherein the at least one drone sensor of the at least one drone is configured to detect one or more characteristics of an environment surrounding the wheeled cargo trailer.

5. The system of claim 2, wherein the at least one drone is configured to communicate feedback from the at least one drone sensor of the at least one drone to the autonomously operated vehicle, and wherein the autonomously operated vehicle is adapted to adjust the shifting of the wheeled cargo trailer based on the feedback from the at least one drone.

6. The system of claim 2, further comprising a landing assembly positioned on the autonomously operated vehicle, wherein the landing assembly comprises a support structure, wherein the at least one drone comprises a landing gear structure adapted to engage with the support structure, and wherein the at least one drone is configured to engage the landing gear structure of the at least one drone with the support structure when the vehicle sensor detects that the blind spot around the vehicle is no longer present.

7. The system of claim 2, wherein the at least one drone comprises an at least one aerial drone, and wherein the at least one aerial drone is operable autonomously.

8. The system of claim 2, wherein the at least one drone comprises an at least one ground-based drone, and wherein the at least one ground-based drone is operable autonomously.

9. The system of claim 1, further comprising a control device comprising one or more computer processors configured to control operation of the vehicle and the at least one drone, the control device comprising a third communication component adapted to communicate with the first communication component and the second communication component.

10. A method for shifting wheeled objects using a vehicle and at least one drone, the method comprising:
- positioning the vehicle at a first location, the vehicle comprising a vehicle propulsion system, a coupling assembly useable for releasably attaching the vehicle to a wheeled object, a first sensor, and a first communication component;
- releasably attaching the coupling assembly to a coupling structure on the vehicle to releasably secure the vehicle to the wheeled object;
- in response to the first sensor identifying a blind spot around the wheeled object, deploying the at least one drone from the vehicle, the at least one drone comprising a drone propulsion system, a second sensor, and a second communication component;
- positioning the at least one drone so that the second sensor monitors the blind spot while the wheeled object is being shifted, wherein the positioning is based on one or more communications between the first communication component and the second communication component and
- shifting the wheeled object to a second location using the vehicle releasably secured to the wheeled object, wherein the shifting is based on data collected by the first sensor and data collected by the second sensor.

11. The method of claim 10, wherein the shifting further comprises adjusting, in coordination, a position of the vehicle and a position of the at least one drone relative to the wheeled object.

12. The method of claim 10, wherein the shifting further comprises adjusting a speed of the at least one drone relative to the wheeled object as the wheeled object is shifted by the vehicle.

13. The method of claim 10, further comprising:
- positioning the wheeled object at a second location; and
- retrieving the deployed at least one drone to a landing position.

14. A system for shifting wheeled objects, the system comprising:
- a vehicle, comprising:
  - a vehicle propulsion system, and
  - a coupling assembly useable for releasably attaching the vehicle to a wheeled object,
  - a blind spot sensor,
  - a first communication component, and
  - at least one sensor coupled to the vehicle;
- at least one drone, comprising:
  - a drone propulsion system,
  - at least one sensor coupled to the at least one drone, and
  - a second communication component; and
- a computing device comprising one or more processors adapted to execute computer-executable instructions stored on one or more computer-readable media to perform a method of coordinating movement of the vehicle and the at least one drone relative to the wheeled object while the wheeled object is being shifted by the vehicle, the method comprising:
  - deploying the at least one drone in response to an identification by the blind spot sensor of at least one blind spot around the wheeled object for the at least one vehicle sensor,
  - positioning the at least one drone so that the at least one sensor of the at least one drone monitors the blind spot of the at least one sensor of the vehicle while the wheeled object is being shifted by the vehicle,
  - detecting a position of the wheeled object using the at least one sensor of the at least one drone, and
  - communicating an instruction to the vehicle to shift the vehicle from a first position of the vehicle based on the position of the wheeled object.

15. The system of claim 14, wherein the method further comprises communicating an instruction to the at least one drone to adjust a speed of the at least one drone based on a speed of the wheeled object being shifted.

16. The system of claim 14, wherein the method further comprises communicating an instruction to the at least one drone to deploy the at least one drone from a landing assembly located on the vehicle, and returning the drone to the landing assembly located on the vehicle after the vehicle has shifted to a second position of the vehicle.

* * * * *